(12) United States Patent
Tokumaru

(10) Patent No.: US 8,655,520 B2
(45) Date of Patent: Feb. 18, 2014

(54) AUTOMATIC TRAIN CONTROL DEVICE AND TRAIN CONTROL METHOD

(75) Inventor: Makoto Tokumaru, Tokyo (JP)

(73) Assignee: Mitsubishi Electric Corporation, Chiyoda-Ku, Tokyo (JP)

( * ) Notice: Subject to any disclaimer, the term of this patent is extended or adjusted under 35 U.S.C. 154(b) by 155 days.

(21) Appl. No.: 13/391,133

(22) PCT Filed: Aug. 10, 2010

(86) PCT No.: PCT/JP2010/063571
§ 371 (c)(1),
(2), (4) Date: Mar. 6, 2012

(87) PCT Pub. No.: WO2011/021544
PCT Pub. Date: Feb. 24, 2011

(65) Prior Publication Data
US 2012/0166025 A1 Jun. 28, 2012

(30) Foreign Application Priority Data
Aug. 19, 2009 (JP) .................... 2009-190258

(51) Int. Cl.
*G05D 1/00* (2006.01)
*G05D 3/00* (2006.01)
*G06F 7/00* (2006.01)
*G06F 17/00* (2006.01)

(52) U.S. Cl.
USPC ........ 701/20; 701/1; 701/19; 701/70; 701/93; 701/117; 246/182 A; 246/182 C; 246/182 R

(58) Field of Classification Search
USPC ............... 701/1, 2, 19, 20, 36, 45, 70, 93, 96, 701/116, 117; 246/3, 4, 5, 6, 14, 20, 21, 27, 246/34 R, 122 R, 167 R, 176, 182 A, 182 B, 246/182 C, 182 R, 187 A, 187 B
See application file for complete search history.

(56) References Cited

U.S. PATENT DOCUMENTS 5,452,870 A 9/1995 Heggestad
7,099,754 B2 * 8/2006 Sugita et al. ............... 701/19
2005/0133673 A1 * 6/2005 Sugita et al. ............. 246/167 R

FOREIGN PATENT DOCUMENTS

JP 2001-286009 A 10/2001
JP 2002-240715 A 8/2002
(Continued)

OTHER PUBLICATIONS

International Search Report (PCT/ISA/210) issued on Sep. 7, 2010, by Japanese Patent Office as the International Searching Authority for International Application No. PCT/JP2010/063571.

(Continued)

*Primary Examiner* — Rami Khatib
(74) *Attorney, Agent, or Firm* — Buchanan Ingersoll & Rooney PC

(57) ABSTRACT

An automatic train control device including a ground control device that computes a target stop position of a train, and in-vehicle control devices that receive the target stop position transmitted from the ground control device and compute speed control patterns to control the speed of the trains, respectively. On a route, a radio-equipped train that wirelessly transmits train ID•train position to the ground control device and a radio-unequipped train coexist. The ground control device manages on-rail information acquired from each track circuit, the train ID•train position, a train ID, and a train type in association with each other, calculates stop track circuit information, and calculates the target stop position for the radio-equipped train.

8 Claims, 4 Drawing Sheets

(56) References Cited

FOREIGN PATENT DOCUMENTS

| JP | 2002-316644 A | 10/2002 |
|---|---|---|
| JP | 3574917 B2 | 10/2004 |
| JP | 2009-096405 A | 5/2009 |

OTHER PUBLICATIONS

Written Opinion (PCT/ISA/237) issued on Sep. 7, 2010, by Japanese Patent Office as the International Searching Authority for International Application No. PCT/JP2010/063571.

* cited by examiner

AUTOMATIC TRAIN CONTROL DEVICE AND TRAIN CONTROL METHOD

FIELD

The present invention relates to an automatic train control device and a train control method for automatically controlling speeds of trains, and more particularly to an automatic train control device and a train control method in which a position of a train is managed mainly in a vehicle, train position information is transmitted to a ground control device by using means such as a radio device, and the ground control device performs control of intervals among trains based on a plurality of train positions.

BACKGROUND

In conventional railways, such a trial has been achieved that when a failure occurs in a preceding train, an efficient fail-safe property for subsequent trains is ensured, and the fail-safe property is introduced as a cost-effective method.

As means for solving this problem, a conventional technique described in Patent Literature 1 mentioned below is constituted as follows. An in-vehicle control device has a function of detecting a position of a train, and transmits detected train position information to a ground side via a radio communication unit. A general ground-side control device having a ground-side radio device and a ground control device is installed on the ground side. The ground-side radio device receives the train position information transmitted from the radio communication unit, and the ground control device determines a permitted travel position, which is a critical position for the train to travel safely.

More specifically, the ground control device includes a train travel controller. When a failure is detected in position information of a preceding train, the train travel controller obtains the permitted travel position by subtracting a position detection error of another train for which a permitted travel position is to be determined, a position detection error of the preceding train, and a distance which the preceding train may retreat from the position of the preceding train to control an interval between the trains. As a result, the conventional technique described in Patent Literature 1 ensures an efficient fail-safe property with respect to subsequent trains even if a failure occurs in the train obstructing a track ahead and establishes the fail-safe property by a cost-effective method.

CITATION LIST

Patent Literature

Patent Literature 1: Japanese Patent No. 3574917

SUMMARY

Technical Problem

However, because the conventional technique described in Patent Literature 1 presupposes an operation by a new train control system corresponding to only trains mounted with a radio communication unit, there is a problem in that trains equipped with a radio device and trains with no radio device cannot travel in a mixed manner in the train control system.

The present invention has been achieved to solve the above problems, and an object of the present invention is to provide an automatic train control device and a train control method that enable both kinds of trains with a radio device and with no radio device to travel in a mixed manner in the same train control system.

Solution to Problem

In order to solve the above-mentioned problems and achieve the object of the present invention, there is provided an automatic train control device including a ground device that computes a target stop position of a train, and an in-vehicle device that receives the target stop position transmitted from the ground device and computes a speed control pattern of the train to control a speed of the train, wherein on a route, a radio-equipped train that wirelessly transmits a first on-rail position that is an on-rail position of the radio-equipped train on the route to the ground device, and a radio-unequipped train that cannot transmit wirelessly an on-rail position of the radio-unequipped train to the ground device coexist, and the ground device manages a second on-rail position that is track circuit information acquired from each track circuit on the route and indicating a track circuit in which each of the trains is located, the first on-rail position, a train ID for identifying each of the trains, and a train type indicating whether each train is the radio-equipped train, in association with each other, calculates stop track circuit information with respect to each of the trains, and calculates a target stop position for the radio-equipped train.

Advantageous Effects of Invention

According to the present invention, the train ID and the train position of radio-equipped trains and on-rail information of radio-unequipped trains are managed to determine whether a subsequent train is a radio-equipped train, and a target stop position and a stop track circuit are transmitted to the train according to the type of the subsequent train. Accordingly, the radio-equipped trains and radio-unequipped trains can travel in a mixed manner in the same train control system.

DESCRIPTION OF EMBODIMENTS

Exemplary embodiments of an automatic train control device and a train control method according to the present invention will be explained below in detail with reference to the accompanying drawings. The present invention is not limited to the embodiments.

First Embodiment

Figure 1:
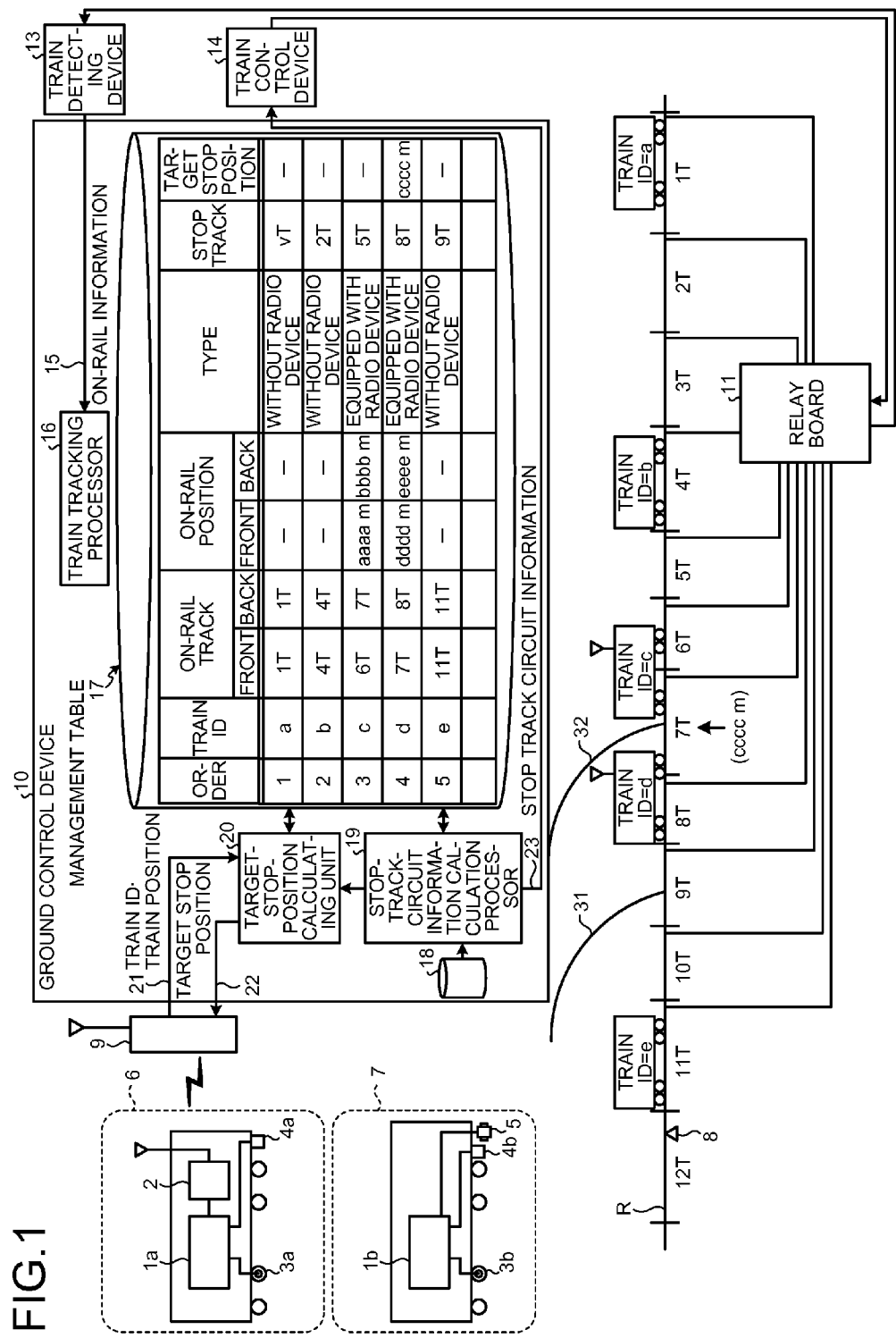
FIG. 1 is a diagram depicting a configuration of an automatic train control device according to a first embodiment of the present invention.

FIG. 1 depicts a configuration of an automatic train control device according to a first embodiment of the present invention. As a main configuration, the automatic train control device includes an in-vehicle control device (hereinafter, simply "an in-vehicle device") 1a and an in-vehicle device 1b mounted on trains, and a ground control device ("hereinafter, simply "a ground device") 10 installed on the ground.

As an example, a state where a train equipped with a radio device (hereinafter, simply "a radio-equipped train") 6 and a train with no radio device (hereinafter, simply "a radio-unequipped train") 7 coexist on a route R is shown. To these trains, train IDs such as "a" to "e" are respectively allocated. Trains with the ID=c, d are the radio-equipped trains 6, and trains with the ID=a, b, e are the radio-unequipped trains 7 that cannot transmit on-rail positions of the trains to the ground device 10 wirelessly. Respective trains in FIG. 1 are conceptually shown for explaining operations of the ground device 10 and the trains.

Ground coils for position correction (hereinafter, simply "ground coils") 8 are installed with an interval of, for example, about several kilometers on the route R on which the radio-equipped trains 6 and the radio-unequipped trains 7 travel. The ground coils 8 are connected to a train-control-signal/train-detection-signal relay board (hereinafter, simply "a relay board") 11.

(Radio-Equipped Train)

For example, the in-vehicle device 1a, an in-vehicle radio device 2, a tachometer generator 3a, and a pickup coil 4a are mounted on the radio-equipped train 6. The in-vehicle device 1a computes a train position by using the tachometer generator 3a and corrects the train position every time the train passes the ground coil 8. Specifically, the ground coils 8 output absolute position information, and the in-vehicle device 1a corrects the train position by using the output, associates the corrected train position with the train ID, and outputs the associated train position as train ID•train position 21. The train position (first on-rail position) included in the train ID•train position 21 indicates an on-rail position on the route R. The actual in-vehicle device 1a includes other devices and circuits such as a supply circuit; however, these elements are omitted in FIG. 1.

Furthermore, because the radio-equipped train 6 is mounted with the in-vehicle radio device 2, the radio-equipped train 6 can wirelessly transmit the train ID•train position 21 to the ground device 10. Because the in-vehicle radio device 2 can also receive a target stop position 22 wirelessly transmitted from the ground device 10, the in-vehicle device 1a creates a speed control pattern 32 based on the received target stop position 22.

(Radio-Unequipped Train)

For example, the in-vehicle device 1b, a tachometer generator 3b, a pickup coil 4b, and a receiving coil 5 are mounted on the radio-unequipped train 7. The in-vehicle device 1b computes a train position by using the tachometer generator 3b and corrects the train position every time the train passes the ground coil 8.

Specifically, the ground device 10 creates stop track circuit information 23 by performing computing described later and transmits the information to the in-vehicle device 1b. The in-vehicle device 1b referred to as an in-vehicle main-type ATC is mounted on the radio-unequipped train 7. The in-vehicle device 1b calculates a brake speed to a stop position according to in-vehicle data relating to the performance of the vehicle and a track circuit (for example, a distance, a route, a gradient, and a speed limit), the stop track circuit information 23, and the train position, to control the speed of the train. The stop track circuit information 23 indicates a name or number (for example, track circuits 1T to 11T) of a track circuit for the train to stop.

The receiving coil 5 receives a digital telegraph (the stop track circuit information 23) transmitted on the route R. Specifically, a rail is used for transmitting a signal (the stop track circuit information 23) from the ground device 10 to the in-vehicle device 1b, and the in-vehicle device 1b receives the stop track circuit information 23 transmitted on the rail by the receiving coil 5. That is, the in-vehicle device 1b receives the stop track circuit information 23 by electromagnetically coupling the receiving coil 5 with the rail, and creates a speed control pattern 31 shown in FIG. 1 based on the stop track circuit information 23.

(Ground-Side Device)

A train detecting device 13, a train control device 14, the relay board 11, the ground device 10, and a ground radio device 9 are installed on the ground.

The relay board 11 is used, for example, for relaying the on-rail position of the radio-unequipped train 7 to the train detecting device 13. The train detecting device 13 receives information relating to the on-rail track circuit of the train via the relay board 11, and outputs the information as on-rail information (a second on-rail position) 15 to a train tracking processor 16. The on-rail information 15 is track circuit information acquired from the respective track circuits on the route R and indicates track circuits in which trains are located. Specifically, when the radio-unequipped train 7 having the ID=b moves from a track circuit 5T to a track circuit 4T, the on-rail information 15 indicates that information of the track circuit 5T changes from 1 to 0, and information of the track circuit 4T changes from 0 to 1. For example, when the radio-unequipped train 7 has left a predetermined train depot, the train tracking processor 16 stores a train ID acquired from the radio-unequipped train 7 in a management table 17, and manages the train IDs, the on-rail track circuits, and the train types in association with each other in the management table 17 based on the on-rail information 15.

As a main configuration, the ground device 10 includes the train tracking processor 16, a target-stop-position calculating unit 20 (hereinafter, simply "a calculating unit 20"), and a stop-track-circuit information calculation processor 19 (hereinafter, simply "processor 19").

(Train Tracking Processor)

The train tracking processor 16 manages information in the train order•on-rail position•train type•stop track/position management table 17 (hereinafter, simply "management table 17") based on the on-rail information 15 transmitted from the train detecting device 13, and sequentially updates an on-rail track in the management table 17 in response to the on-rail position of a train traveling on the route R, for example. Specifically, for example, when the radio-unequipped train 7 having the ID=b moves from the track circuit 5T to the track circuit 4T, the on-rail information 15 of the track circuit 5T changes from 1 to 0, and the on-rail information 15 of the track circuit 4T changes from 0 to 1. The train tracking processor 16 sequentially updates an order in the management table 17 in response to changes in the on-rail information 15, thereby tracking the on-rail position of the train.

In the management table 17, "order", "train ID", "on-rail track", "on-rail position", "type", "stop track", "target stop position", and the like of the radio-equipped trains 6 and the radio-unequipped trains 7 are managed.

These items are explained below. The "order" indicates an order of trains in a traveling direction and numbers from 1 to 5, for example, are sequentially allocated from a top car (ID=a) in an area that is administrated by the ground device 10 shown in FIG. 1, respectively. The "train ID" is a unique number specific to a train. The type indicates whether the train is a radio-equipped train or a radio-unequipped train.

For example, the "on-rail track" indicates track circuits 1T to 11T of the trains on the route R shown in FIG. 1, and is updated by the train tracking processor 16. In the case of the radio-unequipped train 7, because the on-rail position of the train having the ID=a, for example, is managed for each track circuit, the same track circuit (1T) is stored in fields "front" and "back" of the on-rail track in the management table 17.

Meanwhile, in the case of the radio-equipped train 6, for a train having the ID=c, for example, a track circuit (6T) where the first car is located is stored in a field "front" of the on-rail track, and a track circuit (7T) where the last car is located is stored in a field "back" of the on-rail track.

The "on-rail position" indicates an on-rail position in each track circuit in a unit of meter (m), for example. Specifically, for example, in the case of the train having the ID=c (the radio-equipped train 6), an on-rail position aaaa (m) in the track circuit 6T where the first car is located is stored in the field "front" of the on-rail track. An on-rail position bbbb (m) on the track circuit 7T where the last car is located is stored in the field "back" of the on-rail track. The same thing applies to a train having the ID=d. These on-rail positions are based on the train ID•train position 21 transmitted from the ground radio device 9 to the calculating unit 20. In the case of the radio-unequipped train 7, because the on-rail position of the train is managed for each track circuit, these on-rail positions are not recorded in the management table 17.

The "stop track" indicates the stop track circuit information 23 calculated by the processor 19. The stop track circuit information 23 is computed by the processor 19 with respect to all the trains regardless of the radio-equipped train 6 or the radio-unequipped train 7. For example, a stop track of the train having the ID=c is 5T, and a stop track of the train having the ID=e is 9T.

The "target stop position" indicates a target stop position calculated by the calculating unit 20 in a unit of meter (m), for example. As an example, a target stop position cccc (m) of the train having the ID=d (the radio-equipped train 6) is shown in the management table 17. The target stop position cccc (m) is distance information calculated so that a subsequent train can stop with a sufficient space left from a preceding train. For example, when about 20 meters are set as an inter-vehicular distance between the end of the preceding train (ID=c) and the subsequent train (ID=d), the target stop position cccc (m) is calculated to be a position 20 meters behind the end of the train having the ID=c.

In FIG. 1, the radio-equipped train 6 having the ID=c as the preceding train and the radio-equipped train 6 having the ID=d as the subsequent train thereof are shown. When two or more radio-equipped trains 6 successively travel, the calculating unit 20 receives information relating to a train head position and a train length from the radio-equipped train 6 having the ID=c, and calculates the target stop position 22 of the subsequent train by taking a margin distance into consideration.

A stop-track-circuit information calculation table (hereinafter, simply "a calculation table") 18 provides a stop track circuit corresponding to an on-rail track circuit of a train.

(Stop-Track-Circuit Information Calculation Processor)

The processor 19 calculates the stop track circuit information 23 for each train by referring to the calculation table 18 and the management table 17. The processor 19 stores the calculated stop track circuit information 23 in the management table 17 in association with the train ID and the vehicle type, and transmits the calculated stop track circuit information 23 to the train control device 14. The train control device 14 having received the stop track circuit information 23 transmits the stop track circuit information 23 to the route R. The radio-unequipped train 7 receives the stop track circuit information 23 from the route R to calculate the speed control pattern 31.

Specifically, the processor 19 refers to the management table 17, and when a train is a radio-unequipped train 7 (for example, the train with the ID=e), calculates the stop track circuit information 23 (the track circuit 9T) of the train with the ID=e based on the calculation table 18, taking into consideration the margin distance from the on-rail position of the preceding train (for example, the train with the ID=d). The processor 19 outputs the calculated stop track circuit information 23 (track circuit 9T) to the train control device 14. The train with the ID=e receives the stop track circuit information 23, which is output to the track circuit 11T via the train control device 14, by the receiving coil 5. The in-vehicle device 1b calculates the speed control pattern 31 shown in FIG. 1 based on the stop track circuit information 23 and the traveling speed, and performs brake control according to the speed control pattern 31.

(Target Stop-Position Calculating Unit)

The calculating unit 20 calculates a target stop position 22 based on the management table 17. Specifically, an example of calculating the target stop position 22 of the train with the ID=d is explained here. The calculating unit 20 refers to the management table 17, and when a train is the radio-equipped train 6 (for example, ID=d), calculates the target stop position 22 of the train with the ID=d by considering the margin distance from the on-rail position of the preceding train. In FIG. 1, a train immediately before the train with the ID=d is the radio-equipped train 6 (the train with the ID=c), and in this case, the calculating unit 20 calculates the target stop position 22 by considering a distance from the last car of the train with the ID=c. The calculating unit 20 outputs the calculated target stop position 22 to the ground radio device 9, and the ground radio device 9 transmits the target stop position 22 acquired from the calculating unit 20 to the train with the ID=d. The in-vehicle device 1a computes the speed control pattern 32 shown in FIG. 1 based on the target stop position 22 and the traveling speed, and performs brake control according to the speed control pattern 32.

In this manner, the ground device 10 calculates the stop track circuit information 23 with respect to all the trains being in travel, and determines whether the subsequent train is the radio-equipped train 6 to calculate the target stop position 22 with respect to the radio-equipped train 6. That is, the ground device 10 manages the track circuit information indicating track circuits in which the respective trains are located, acquired from the respective track circuits on the route R, the track ID, the on-rail position information, and the train type in association with each other, calculates the stop track circuit information 23 with respect to the respective trains, and calculates the target stop position 22 with respect to the radio-equipped train 6. Therefore, the automatic train control device according to the first embodiment can reduce the interval between trains while ensuring the fail-safe property of each train, even when the radio-equipped trains 6 and the radio-unequipped trains 7 travel in a mixed manner in the same train control system. That is, the ground device 10 can stop the radio-equipped train 6 with the ID=d, for example, in the same section as an on-rail section (7T) of the last car of the preceding train.

(Operation)

Figure 2:
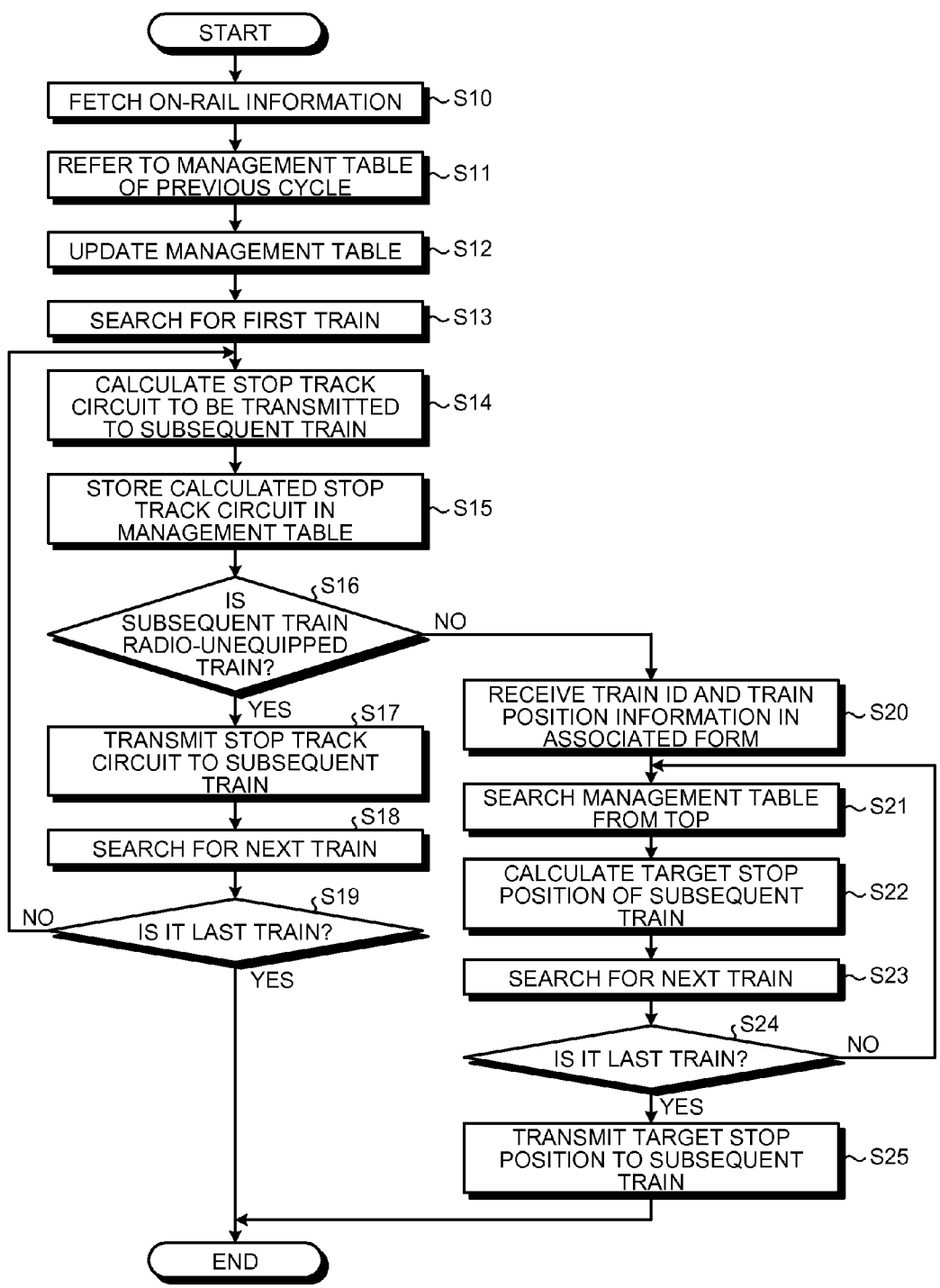
FIG. 2 is a flowchart for explaining an operation of the automatic train control device according to the first embodiment.

Operations of the processor 19 and the calculating unit 20 are mainly explained with reference to a flowchart. FIG. 2 is a flowchart for explaining the operation of the automatic train control device according to the first embodiment of the present invention.

The train tracking processor 16 fetches the on-rail information 15 output from the train detecting device 13 (Step S10), and refers to the management table 17 of the previous cycle (Step S11). The train tracking processor 16 updates the management table 17 to the latest state based on Steps S10 and S11 (Step S12), and searches for the first train (for example, ID=a) in a range managed by the ground device 10 (Step S13).

The processor 19 refers to the management table 17 to read a track circuit (1T in FIG. 1) where the last car of the concerned train (ID=a) is located, calculates the stop track circuit information 23 of a subsequent train (for example, ID=b) (Step S14), and stores the calculated stop track circuit information 23 in the management table 17 (Step S15). The processor 19 determines whether the subsequent train is a radio-unequipped train 7 based on the train ID, and when the train is the radio-unequipped train 7 (YES at Step S16), transmits the stop track circuit information 23 to the subsequent train (ID=b) (Step S17), and increments the number in the order in the management table 17 by one to search for the next train (Step S18). The processor 19 determines whether the train is the last train in the range managed by the ground device 10, and when the train is not the last train (NO at Step S19), repeats the processes at Step S14 and thereafter until the train becomes the last train (YES at Step S19).

At Step S16, when the subsequent train is a radio-equipped train 6 (NO at Step S16), the calculating unit 20 receives the train ID•train position 21 in the associated form from the ground radio device 9 (Step S20). The calculating unit 20 searches the management table 17 from the top thereof (Step S21), and when the train ID matches, additionally stores the corresponding on-rail position in the management table 17. The calculating unit 20 calculates the target stop position 22 of the subsequent train based on the on-rail position stored at Step S21 (Step S22), and additionally stores the calculated target stop position 22 in the management table 17. The calculating unit 20 increments the number in the order in the management table 17 by one to search for the next train (Step S23). The calculating unit 20 determines whether the train is the last train in the range managed by the ground device 10, and when the train is not the last train (NO at Step S24), repeats the processes at Step S21 and thereafter until the train becomes the last train. When the train is the last train (YES at Step S24), the calculating unit 20 designates the train ID of the train whose target stop position 22 is stored, as a destination and transmits the target stop position 22 to the designated subsequent train (Step S25).

As described above, the automatic train control device according to the present embodiment manages the train ID•train positions 21 of the radio-equipped trains 6 and the on-rail information 15 of the radio-unequipped trains 7, determines whether a subsequent train is the radio-equipped train 6, and transmits the target stop position 22 or the stop track circuit information 23 to the train according to the type of the subsequent train. Therefore, even if the radio-equipped trains 6 and the radio-unequipped trains 7 travel in a mixed manner in the same train control system, the fail-safe property of each train can be ensured. Further, when the radio-equipped trains 6 successively travel, the train headway can be reduced. Furthermore, because the stop track circuit information 23 and the target stop position 22 can be calculated by using the management table 17, the automatic train control device according to the present embodiment is cost effective as compared to, for example, a case where the stop track circuit information 23 and the target stop position 22 are individually calculated by using a plurality of management tables 17.

Second Embodiment

The automatic train control device according to the first embodiment relates to a case where the radio-equipped trains 6 and the radio-unequipped trains 7 with the in-vehicle main-type ATC travel in a mixed manner. An automatic train control device according to a second embodiment of the present invention relates to a case where the radio-unequipped trains 7 with the in-vehicle device 1b referred to as a ground main-type ATC and the radio-equipped trains 6 travel in a mixed manner. A configuration of the automatic train control device according to the present embodiment is explained below. Constituent elements identical to those of the first embodiment are denoted by like reference signs and explanations thereof will be omitted, and only different elements are described below.

Figure 3:
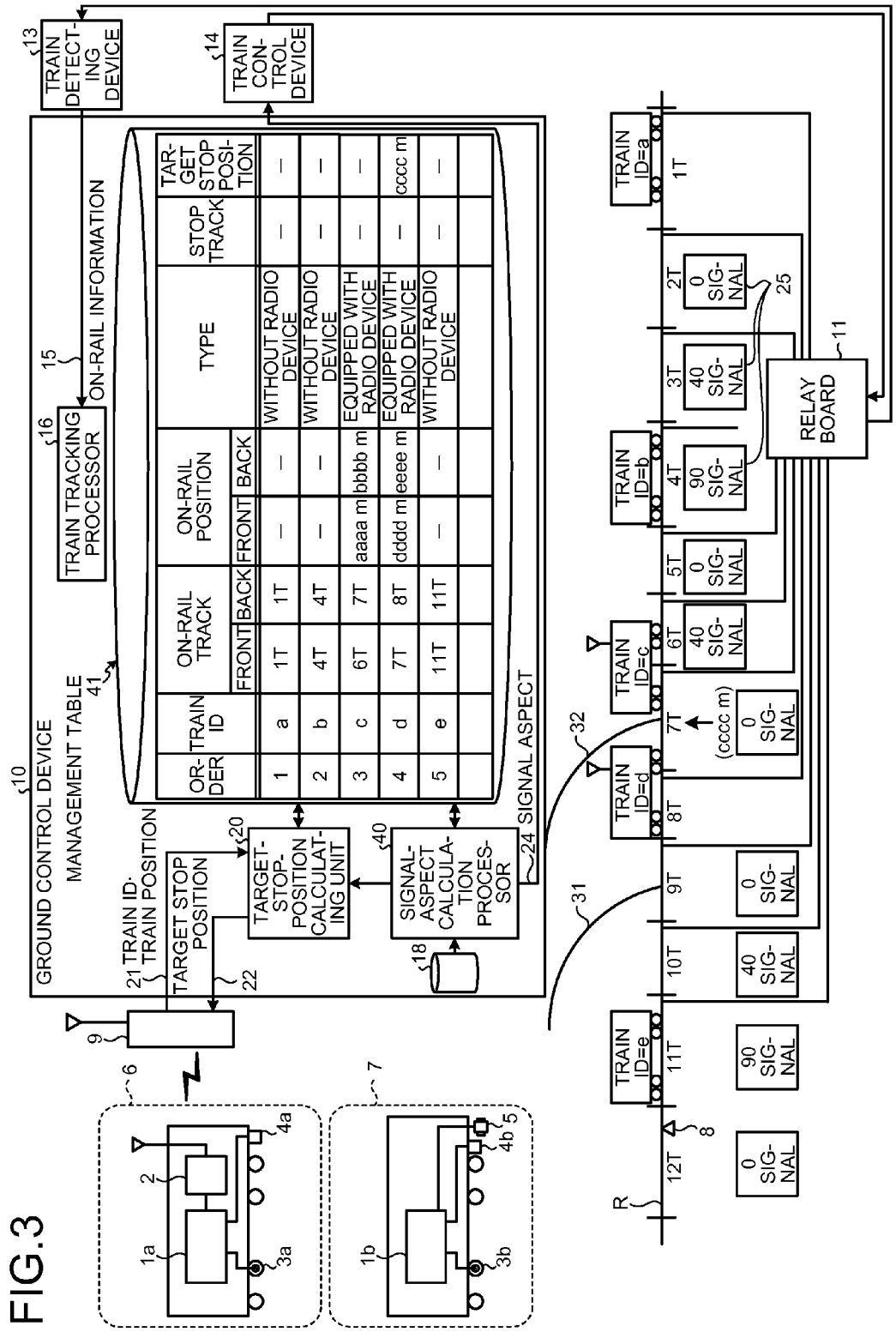
FIG. 3 is a diagram depicting a configuration of an automatic train control device according to a second embodiment of the present invention.

FIG. 3 is a diagram depicting a configuration of the automatic train control device according to the second embodiment. The ground device 10 shown in FIG. 3 includes a signal-aspect calculation processor 40 (hereinafter, simply "processor 40") instead of the processor 19, which is a different point from the ground device 10 according to the first embodiment.

In a train order•on-rail position•train type•stop position management table 41 (hereinafter, simply "management table 41") shown in FIG. 3, the stop track is not managed. This is because the processor 40 described later is configured to calculate a signal aspect 24 and transmit the calculated signal aspect 24 to the respective trains. Specifically, the automatic train control device according to the second embodiment is for the ground main-type ATC as described above, and transmits a signal aspect (for example, a 0 signal, a 40 signal, or a 90 signal) serving as a speed limit signal 25 to the respective trains from the ground device 10, for example. The in-vehicle device having received the signal aspect 24 controls the train speed by braking automatically when the current speed of the train exceeds the speed in the signal aspect 24.

An operation of the automatic train control device according to the present embodiment is explained below. The processor 40 refers to the management table 41 to calculate the signal aspect 24 with respect to each train, and stores the calculated signal aspect 24 in the management table 41 in association with the train ID and the train type. The processor 40 further transmits the calculated signal aspect 24 to the train control device 14. The train control device 14 having received the signal aspect 24 transmits the signal aspect 24 to the route R. The radio-unequipped train 7 receives the signal aspect 24 from the route R, and calculates the speed control pattern 31 as shown in FIG. 3. The signal aspect 24 transmitted to the train is transmitted as information in which the speed limit gradually changes, for example, from 90 km/h to 40 km/h and then to 0 km/h as shown in FIG. 3.

Specifically, the processor 40 refers to the management table 41, and when a train is the radio-unequipped train 7 (for example, the train having the ID=e), the processor 41 calculates the signal aspect 24 of the train having the ID=e as a 90 signal, a 40 signal, and a 0 signal in this order based on the calculated table 41 by considering the margin distance to the on-rail position of the preceding train (for example, the train having the ID=d). The processor 40 outputs the calculated signal aspect 24 to the train control device 14. The train having the ID=e receives the signal aspect 24, which is output to the track circuit 11T via the train control device 14, by the receiving coil 5. The in-vehicle device 1b calculates the speed control pattern 31 shown in FIG. 3 based on the signal aspect 24 and the traveling speed, and performs braking control according to the speed control pattern 31.

(Operation)

Figure 4:
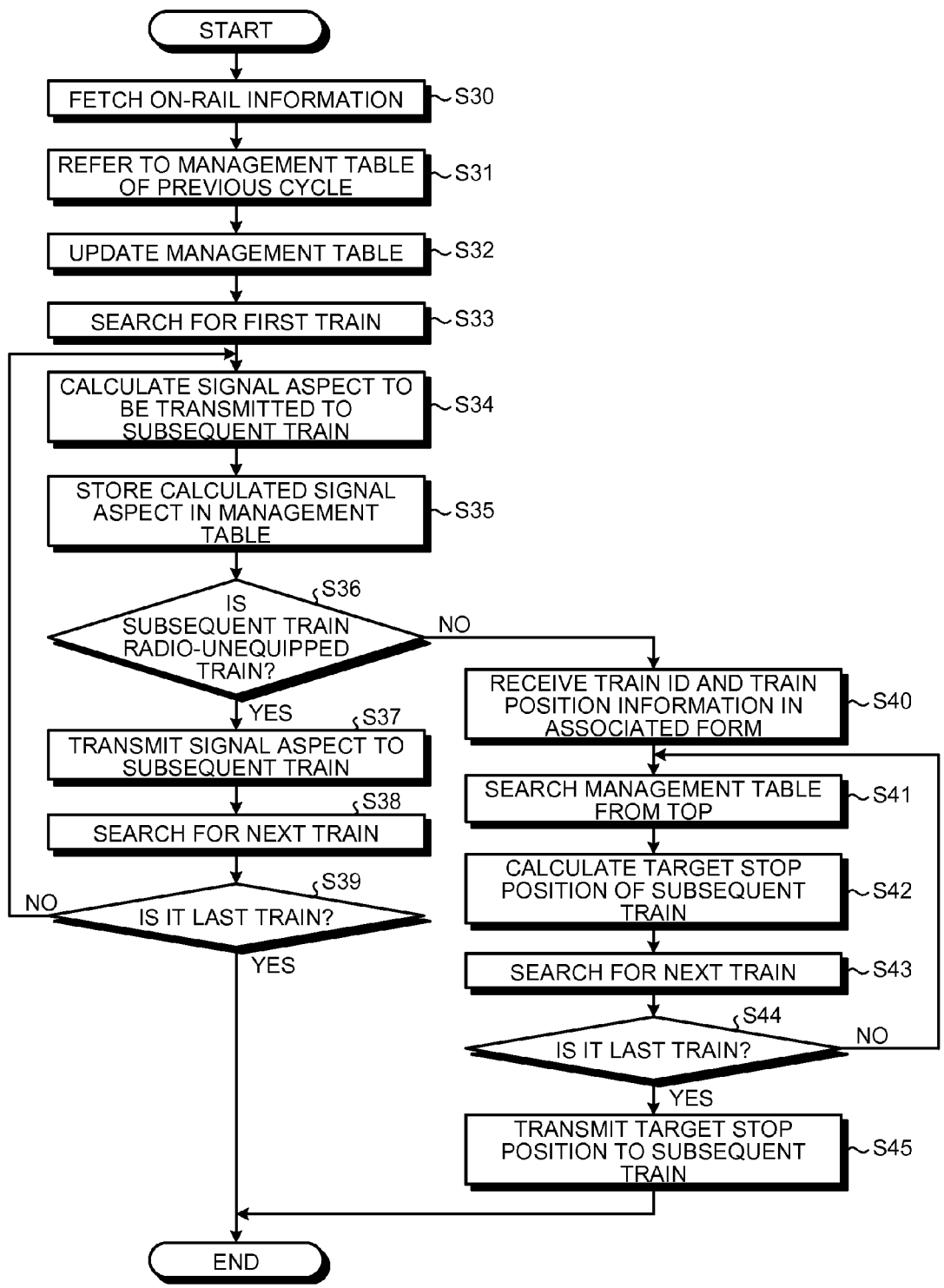
FIG. 4 is a flowchart for explaining an operation of the automatic train control device according to the second embodiment.

An operation of the automatic train control device according to the present embodiment is explained with reference to a flowchart, focusing on the processor 40 and the calculating unit 20. FIG. 4 is a flowchart for explaining an operation of the automatic train control device according to the second embodiment.

The train tracking processor 16 fetches the on-rail information 15 output from the train detecting device 13 (Step S30), and refers to the management table 41 of the previous cycle (Step S31). The train tracking processor 16 updates the management table 41 to a latest state based on Steps S30 and S31 (Step S32), and searches for the first train (for example, ID=a) in a range managed by the ground device 10 (Step S33).

The processor 40 refers to the management table 41 to read a track circuit (1T in FIG. 1) in which the last car of the concerned train (ID=a) is located, calculates the signal aspect 24 of a subsequent train (for example, ID=b) (Step S34), and stores the calculated signal aspect 24 in the management table 41 (Step S35). The processor 40 determines whether the subsequent train is the radio-unequipped train 7 based on the train ID, and when the train is the radio-unequipped train 7 (YES at Step S36), transmits the signal aspect 24 to the subsequent train (ID=b) (Step S37), and increments the number in the order in the management table 41 by one to search for the next train (Step S38). The processor 40 determines whether the train is the last train in the range managed by the ground device 10, and when the train is not the last train (NO at Step S39), repeats the processes at Step S34 and thereafter until the train becomes the last train (YES at Step S39).

At Step S36, when the subsequent train is the radio-equipped train 6 (NO at Step S36), the calculating unit 20 receives the train ID•train position 21 in an associated form from the ground radio device 9 (Step S40). The calculating unit 20 searches the management table 41 from the top (Step S41), and when the train ID matches, additionally stores the corresponding on-rail position in the management table 41. The calculating unit 20 calculates the target stop position 22 of the subsequent train based on the on-rail position stored at Step S41 (Step S42), and additionally stores the calculated target stop position 22 in the management table 41. The calculating unit 20 increments the number in the order in the management table 41 by one to search for the next train (Step S43). The calculating unit 20 determines whether the train is the last train in the range managed by the ground device 10, and when the train is not the last train (NO at Step S44), repeats the processes at Step S41 and thereafter until the train becomes the last train. When the train is the last train (YES at Step S44), the calculating unit 20 designates the train ID of the train whose target stop position 22 is stored, as a destination and transmits the target stop position 22 to the designated subsequent train (Step S45).

As described above, the automatic train control device according to the present embodiment manages the train ID•train positions 21 of the radio-equipped trains 6 and the on-rail information 15 of the radio-unequipped trains 7, determines whether a subsequent train is the radio-equipped train 6, and transmits the target stop position 22 or the signal aspect 24 to the train according to the type of the subsequent train. Therefore, the radio-unequipped trains 7 with the ground main-type ATC and the radio-equipped trains 6 can travel in a mixed manner in the same train control system.

INDUSTRIAL APPLICABILITY

As described above, the present invention is applicable to an automatic train control device and a train control method that automatically control the speed of trains and particularly suitable as an invention that enables both kinds of trains with a radio device and with no radio device to travel in a mixed manner in the same train control system.

REFERENCE SIGNS LIST 1a, 1b IN-VEHICLE CONTROL DEVICE
2 IN-VEHICLE RADIO DEVICE
3a, 3b TACHOMETER GENERATOR
4a, 4b PICKUP COIL
5 RECEIVING COIL
6 RADIO-EQUIPPED TRAIN
7 RADIO-UNEQUIPPED TRAIN
8 GROUND COIL FOR POSITION CORRECTION
9 GROUND RADIO DEVICE
10 GROUND CONTROL DEVICE
11 TRAIN-CONTROL-SIGNAL/TRAIN-DETECTION-SIGNAL RELAY BOARD
13 TRAIN DETECTING DEVICE
14 TRAIN CONTROL DEVICE
15 ON-RAIL INFORMATION (SECOND ON-RAIL POSITION)
16 TRAIN TRACKING PROCESSOR
17 TRAIN ORDER•ON-RAIL POSITION•TRAIN TYPE•STOP TRACK/POSITION MANAGEMENT TABLE
18 STOP-TRACK-CIRCUIT INFORMATION CALCULATION TABLE
19 STOP-TRACK-CIRCUIT INFORMATION CALCULATION PROCESSOR
20 TARGET-STOP-POSITION CALCULATING UNIT
21 TRAIN ID•TRAIN POSITION (FIRST ON-RAIL POSITION)
22 TARGET STOP POSITION
23 STOP TRACK CIRCUIT INFORMATION
24 SIGNAL ASPECT
25 SPEED LIMIT SIGNAL
31, 32 SPEED CONTROL PATTERN
40 SIGNAL-ASPECT CALCULATION PROCESSOR
41 TRAIN ORDER•ON-RAIL POSITION•TRAIN TYPE•STOP POSITION MANAGEMENT TABLE
R ROUTE

The invention claimed is:

1. An automatic train control device comprising a ground device that computes a target stop position of a train, and an in-vehicle device that receives the target stop position transmitted from the ground device and computes a speed control pattern of the train to control a speed of the train, wherein
on a route, a radio-equipped train that wirelessly transmits a first on-rail position that is an on-rail position of the radio-equipped train on the route to the ground device, and a radio-unequipped train that cannot transmit wirelessly an on-rail position of the radio-unequipped train to the ground device coexist, and
the ground device manages a second on-rail position that is track circuit information acquired from each track circuit on the route and indicating a track circuit in which each of the trains is located, the first on-rail position, a train ID for identifying each of the trains, and a train type indicating whether each train is the radio-equipped train, in association with each other, calculates stop track circuit information with respect to each of the trains, and calculates a target stop position for the radio-equipped train.

2. The automatic train control device according to claim 1, wherein the ground device includes:

a management table in which the train ID, the first on-rail position, the second on-rail position, and the train type are managed in association with an order of the trains;

a stop-track-circuit information calculation processor that refers to the management table to calculate the stop track circuit information and transmits the stop track circuit information to each train; and a target stop-position calculating unit that refers to the management table to calculate the target stop position and transmits the target stop position to the radio-equipped train.

3. The automatic train control device according to claim 2, wherein when a preceding train and a subsequent train of the preceding train are both the radio-equipped trains, the target stop-position calculating unit calculates a target stop position for the subsequent train after the stop track circuit information is calculated with respect to each of the trains.

4. An automatic train control device comprising a ground device that computes a target stop position of a train, and an in-vehicle device that receives the target stop position transmitted from the ground device and computes a speed control pattern of the train to control a speed of the train, wherein on a route, a radio-equipped train that wirelessly transmits a first on-rail position that is an on-rail position of the radio-equipped train on the route to the ground device, and a radio-unequipped train that cannot transmit wirelessly an on-rail position of the radio-unequipped train to the ground device coexist, and the ground device manages a second on-rail position that is track circuit information acquired from each track circuit on the route and indicating a track circuit in which each of the trains is located, the first on-rail position, a train ID for identifying each of the trains, and a train type indicating whether each train is the radio-equipped train, in association with each other, calculates a signal aspect with respect to each of the trains, and calculates a target stop position for the radio-equipped train.

5. The automatic train control device according to claim 4, wherein the ground device includes:

a management table in which the train ID, the first on-rail position, the second on-rail position, and the train type are managed in association with an order of the trains;

a signal-aspect calculation processor that refers to the management table to calculate the signal aspect and transmits the signal aspect to each of the trains; and a target stop-position calculating unit that refers to the management table to calculate the target stop position and transmits the target stop position to the radio-equipped train.

6. The automatic train control device according to claim 5, wherein when a preceding train and a subsequent train of the preceding train are both the radio-equipped trains, the target stop-position calculating unit calculates a target stop position for the subsequent train after the signal aspect is calculated with respect to each of the trains.

7. A train control method that can be applied to an automatic train control device comprising a ground device that computes a target stop position of a train, and an in-vehicle device that receives the target stop position transmitted from the ground device and computes a speed control pattern of the train to control a speed of the train, wherein on a route, a radio-equipped train that wirelessly transmits a first on-rail position that is an on-rail position of the radio-equipped train on the route to the ground device, and a radio-unequipped train that cannot transmit wirelessly an on-rail position of the radio-unequipped train to the ground device coexist, and the method applied to the ground device includes:

a reception step of receiving the first on-rail position, a train ID transmitted from the in-vehicle device to identify each of the trains, and a second on-rail position that is track circuit information transmitted from each track circuit on the route and indicating a track circuit in which each of the trains is located;

a step of determining a train type indicating whether a train is the radio-equipped train based on the train ID;

a stop-track-circuit information transmission step of calculating stop track circuit information based on the train ID, the second on-rail position, and the train type, and transmitting the stop track circuit information to the radio-unequipped train; and a target stop-position transmission step of calculating a target stop position based on the train ID, the first on-rail position, and the train type, and transmitting the target stop position to the radio-equipped train, when the train is determined to be the radio-equipped train at the step of determining, the method applied to the in-vehicle device of each of the trains includes a step of computing a speed control pattern based on the received stop track circuit information, and the method applied to the in-vehicle device of the radio-equipped train includes a step of computing a speed control pattern based on the received target stop position.

8. A train control method that can be applied to an automatic train control device comprising a ground device that computes a target stop position of a train, and an in-vehicle device that receives the target stop position transmitted from the ground device and computes a speed control pattern of the train to control a speed of the train, wherein on a route, a radio-equipped train that wirelessly transmits a first on-rail position that is an on-rail position of the radio-equipped train on the route to the ground device, and a radio-unequipped train that cannot transmit wirelessly an on-rail position of the radio-unequipped train to the ground device coexist, and the method applied to the ground device includes:

a reception step of receiving the first on-rail position, a train ID transmitted from the in-vehicle device to identify each of the trains, and a second on-rail position that is track circuit information transmitted from each track circuit on the route and indicating a track circuit in which each of the trains is located;

a step of determining a train type indicating whether a train is the radio-equipped train based on the train ID;

a signal aspect transmission step of calculating a signal aspect based on the train ID, the second on-rail position, and the train type, and transmitting the signal aspect to the radio-unequipped train; and a target stop-position transmission step of calculating a target stop position based on the train ID, the first on-rail position, and the train type, and transmitting the target stop position to the radio-equipped train, when the train is determined to be the radio-equipped train at the step of determining, the method applied to the in-vehicle device of each of the trains includes a step of computing a speed control pattern based on the received signal aspect, and the method applied to the in-vehicle device of the radio-equipped train includes a step of computing a speed control pattern based on the received target stop position.

* * * * *